United States Patent
Tao (10) Patent No.: US 8,854,476 B2
(45) Date of Patent: Oct. 7, 2014

(54) DISPLAY SYSTEM WITH IMAGE DISPLAY CORRECTION MECHANISM AND METHOD OF OPERATION THEREOF

(71) Applicant: Samsung Electronics Co., Ltd., Gyeonggi-Do (KR)

(72) Inventor: Li Tao, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/741,054

(22) Filed: Jan. 14, 2013

(65) Prior Publication Data

US 2014/0063267 A1  Mar. 6, 2014

Related U.S. Application Data

(60) Provisional application No. 61/694,168, filed on Aug. 28, 2012.

(51) Int. Cl.
*H04N 17/00* (2006.01)
*H04N 21/60* (2011.01)
*G09G 5/02* (2006.01)
*H04N 17/02* (2006.01)

(52) U.S. Cl.
CPC ........... *H04N 17/02* (2013.01); *G09G 2340/02* (2013.01); *G09G 2320/0242* (2013.01); *G09G 2370/02* (2013.01); *H04N 21/60* (2013.01); *G09G 5/02* (2013.01); *G09G 2340/06* (2013.01)
USPC ........... 348/189; 348/180; 348/181; 348/177; 455/115.1

(58) Field of Classification Search
USPC ......... 348/189, 180, 181, 177, 175, 188, 192; 455/226.1, 115.1; 375/224; 370/241; 358/1.9
See application file for complete search history.

(56) References Cited

U.S. PATENT DOCUMENTS

| 7,075,552 B2 | 7/2006 | Herbert et al. |
| 7,869,619 B2 | 1/2011 | Herbert et al. |
| 8,026,953 B2 | 9/2011 | Lammers et al. |
| 8,493,614 B2 * | 7/2013 | Marcu ............................. 358/1.9 |

* cited by examiner

*Primary Examiner* — Jefferey Harold
*Assistant Examiner* — Jean W Desir
(74) *Attorney, Agent, or Firm* — IP Investment Law Group (57) ABSTRACT

A method of operation of a display system includes: sending a known test sample; retrieving the known test sample; comparing the known test sample and the retrieved known test sample; generating a compensation model based on the comparison for correcting the retrieved known test sample; and providing the compensation model for displaying a corrected display on a device.

18 Claims, 5 Drawing Sheets

DISPLAY SYSTEM WITH IMAGE DISPLAY CORRECTION MECHANISM AND METHOD OF OPERATION THEREOF

CROSS-REFERENCE TO RELATED APPLICATION(S)

This application claims the benefit of U.S. Provisional Patent Application Ser. No. 61/694,168 filed Aug. 28, 2012, and the subject matter thereof is incorporated herein by reference thereto.

TECHNICAL FIELD

An embodiment of the present invention relates generally to a display system, and more particularly to a system for image display.

BACKGROUND

Modern consumer and industrial electronics, especially devices such as graphical display systems, televisions, projectors, cellular phones, portable digital assistants, and combination devices, are providing increasing levels of functionality to support modern life including image display. Research and development in the existing technologies can take a myriad of different directions.

Image display decisions are made every day in many aspects of commerce. When consumers purchase products, image display can be a major influence on the purchasing decision. In modern commerce, there is the ability to purchase over the Internet or through other virtual means. This ability makes the accurate and precise image display even more important since such displays represent through presentation the image display of physical products. It would be disappointing to the purchaser to purchase a product over the Internet under the belief that it was the one in the image display and receive the product only to later realize that the image display was not displayed properly when the product was purchased.

The ability to reproduce precise and accurate image display in a display device is also important in the business of advertising, product packaging and product manufacturing. When such materials are being created, online virtual collaboration systems can be used to review and approve product prototypes of printed images. In these cases, it would be advantageous to use a system or method for reproducing precise and accurate image displays on display devices.

Web video is becoming a very important media type as the Internet is becoming a part of our ordinary life and a major channel to obtain information. Many types of information are available by watching web videos on your PC, PDA, smart phone, and digital media player. In order to allow the web video clips to be readily accessible under the restriction of network bandwidth and storage space, web video clips are generally compressed heavily, which results in degraded images and video.

Thus, a need still remains for an image display system with image display correction mechanism to display images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a display system including: sending a known test sample; retrieving the known test sample; comparing the known test sample and the retrieved known test sample; generating a compensation model based on the comparison for correcting the retrieved known test sample; and providing the compensation model for displaying a corrected display on a device.

An embodiment of the present invention provides a method of operation of a display system including: sending a known test sample having a gamut; retrieving the known test sample having a degraded gamut; comparing, with a control unit, the gamut of the known test sample and the degraded gamut of the retrieved known test sample; generating a compensation model based on the comparison for correcting the retrieved known test sample; and providing the compensation model for displaying a corrected display on a device.

An embodiment of the present invention provides a display system, including: a communication unit configured to send a known test sample and configured to retrieve the known test sample; a control unit configured to compare the known test sample and the retrieved known test sample, and configured to generate a compensation model based on the comparison for correcting the retrieved known test sample; and a storage unit configured to provide the compensation model for displaying a corrected display on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof Referring now to FIG. 1, therein is shown a display system 100 with image display correction mechanism in an embodiment of the present invention. The display system 100 includes a first device 102, such as a client or a server, connected to a second device 106, such as a client or server. The first device 102 can communicate with the second device 106 with a communication path 104, such as a wireless or wired network.

Figure 1:
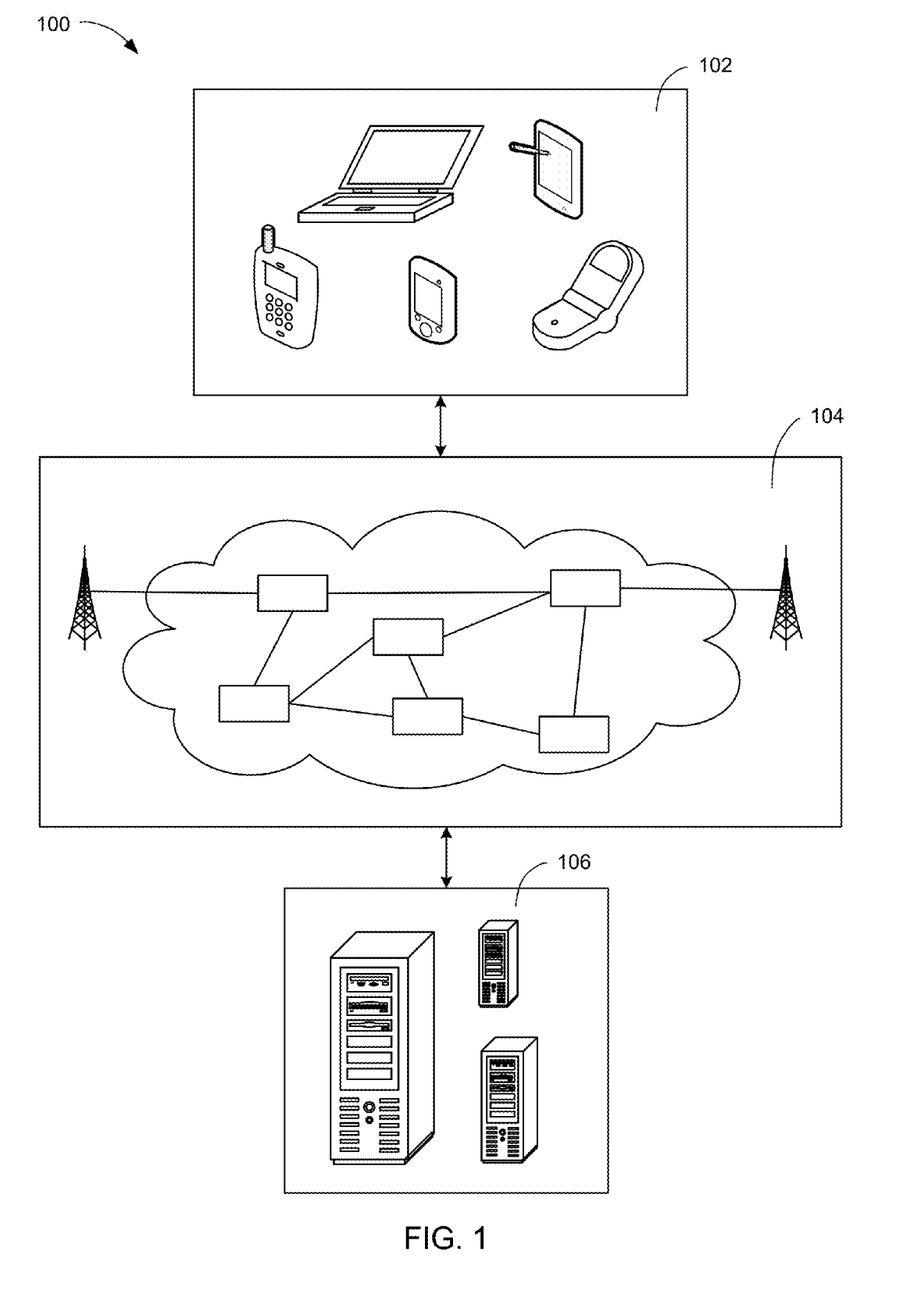
FIG. 1 is a display system with image display correction mechanism in an embodiment of the present invention.

For example, the first device 102 can be of any of a variety of display devices, such as a cellular phone, personal digital assistant, a notebook computer, a liquid crystal display (LCD) system, a light emitting diode (LED) system, or other multifunctional display or entertainment device. The first device 102 can couple, either directly or indirectly, to the communication path 104 to communicate with the second device 106 or can be a stand-alone device.

For illustrative purposes, the display system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the display system 100 is described with the second device 106 as a computing device, although it is understood that the second device 106 can be different types of devices. Also for illustrative purposes, the display system 100 is shown with the second device 106 and the first device 102 as end points of the communication path 104, although it is understood that the display system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2A:
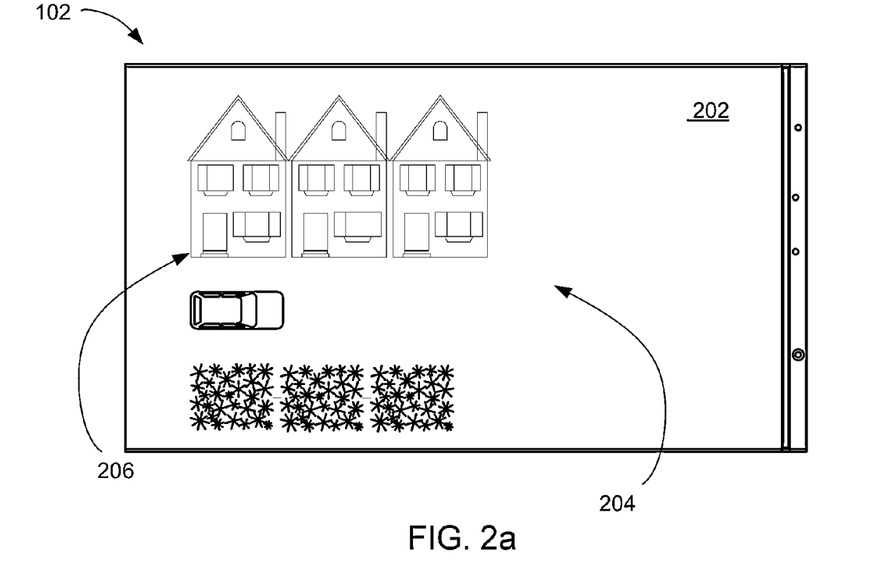
FIGS. 2a and 2b are examples of images on a display interface of the first device of FIG. 1.
Figure 2B:
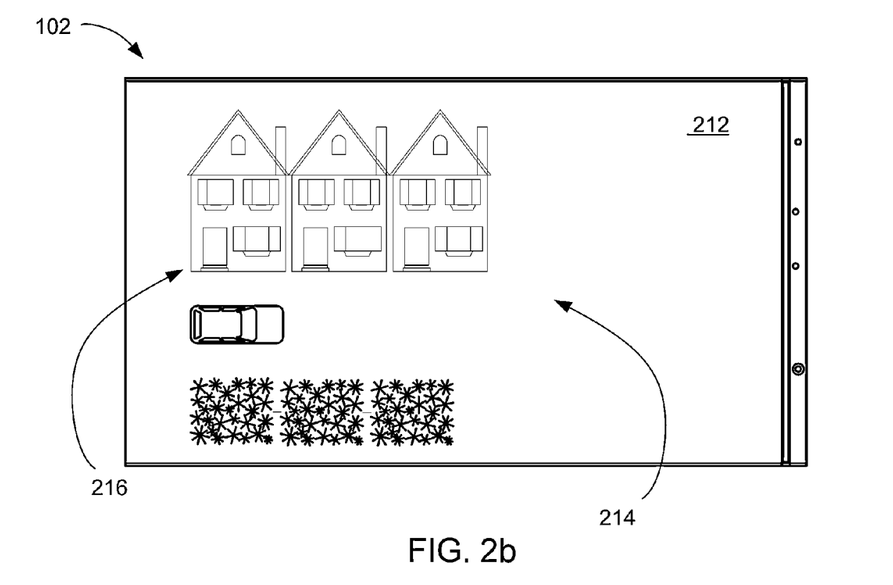

Referring now to FIGS. 2a and 2b, therein is shown examples of images on a first display 202 of the first device of FIG. 1. FIG. 2a depicts a known sample of graphics 204 on first display 202 of the first device 102 and FIG. 2b depicts a degraded sample of graphics 204 shown as graphics 214 on the second display 212 on the first device 102. The first display 202 can display graphics 204 that include images or video.

The graphics 204 including images or video can preferably be formed of multiple pixels 206 having a color or chromaticity. Each of a pixel 206 or group of the pixels 206 can be measured or mapped using mathematical language, equations, or expressions, such as gamut mapping.

Similarly, the graphics 214 including images or video can preferably be formed of multiple pixels 216 having a color or chromaticity. The color or chromaticity of the pixels 216 can change or degrade through processes such as uploading, downloading, any transfer method, or combination thereof, from the color or chromaticity of the pixels 206.

Color of the graphics 204 can be measured or modeled for each of the pixel 206 or groups of the pixel 206. The measured or modeled color of the graphics 204 can be characterized using a gamut mapping technique. A known test sample of the graphics 204 can be characterized by a gamut map for comparison with a gamut map of the graphics 214 that has been transferred such as uploaded or downloaded from remote device such as a web server including a web video server.

The visual differences or comparison in terms of brightness, color and sharpness between the known test sample and the downloaded known test sample can be seen by common viewers. Generally the downloaded known test examples have degraded image qualities which include decreased brightness, less brightness and color contrast, changed colors, and reduced sharpness, etc.

Color fade and shift is one of the common image quality problems associated with web video. To solve this problem, an image color correction or improvement technique can include several aspects related to color including but not limited to chromaticity, luminance, hue, saturation, chroma, intensity, wavelength, purity, or combination thereof.

For example, color quality of the image or video can be improved by inversely compensating the improper color changes such as color fade or shift introduced by transferring such as uploading or downloading the graphics 204, based on an appropriate degradation model, such as Color Degradation Model Metadata (CDMM) of a web video server from which the image(s) or video was sourced.

All these image quality degradations can be quantitatively detected and characterized. A preferred characterization and correction method is developed and provided in the invented display system to deal with the problem of changed or degraded colors, which however can also improve other types of image qualities to some extent. For example, with corrected colors, the color contrast can be significantly improved. In addition, brightness contrast as well as image sharpness may be enhanced as well.

A Color Degradation Model Metadata can be provided by a compute server, the first device 102, or the second device 106 for specific sources such as web servers based on comparison with the known test sample of the graphics 204 and a transferred sample of the graphics 204 from the specific source or web server. The compensation model, which can include Color Degradation Model Metadata for the specific source or web server, can be applied for improved quality to other graphics including images or video received from the specific web server.

It has been discovered that the display system with image display correction mechanism provides consistently improved graphics including images and video, at least based on application of a compensation model, including a degradation model, such as Color Degradation Model Metadata, a correction model, or combination thereof, applied to images and video from a specific source. The gamut map of the graphics 204 are compared to the degraded gamut map of the graphics 214 characterizing at least color fade and shift for the specific remote device.

Figure 3:
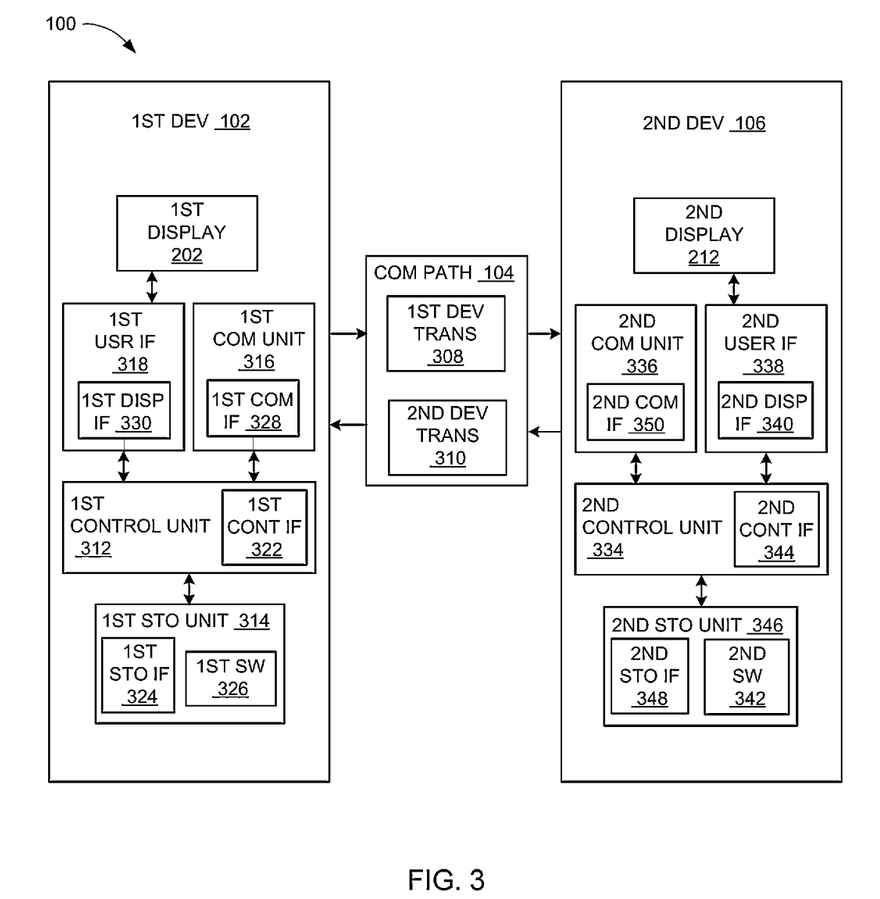
FIG. 3 is an exemplary block diagram of the display system.

Referring now to FIG. 3, therein is shown an exemplary block diagram of the display system 100. The display system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the display system 100 is shown with the first device 102 as a client device, although it is understood that the display system 100 can have the first device 102 as a different type of device. For example, the first device 102 can be a server having a display interface and a display.

Also for illustrative purposes, the display system 100 is shown with the second device 106 as a server, although it is understood that the display system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the display system 100.

The first control unit 312 can be implemented in a number of different manners. For example, the first control unit 312 can be a processor, an application specific integrated circuit (ASIC), an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a desktop computer, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330 as an output device. The first display interface 330 can output to the first display 202, such as a projector, a video screen, a speaker, or any combination thereof.

The first control unit 312 can operate the first user interface 318 to display information generated by the display system 100. The first control unit 312 can also execute the first software 326 for the other functions of the display system 100. The first control unit 312 can further execute the first software 326 for interaction with the communication path 104 via the first communication unit 316.

The second device 106 can be used for implementing the present invention in a multiple device embodiment with the first device 102. The second device 106 can provide the additional or higher performance processing power compared to the first device 102. The second device 106 can include a second control unit 334, a second communication unit 336, a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can output to a second display 212 of FIG. 2, such as a projector, a video screen, a speaker, or any combination thereof.

The second control unit 334 can execute a second software 342 to provide the intelligence to the second device 106 of the display system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the display system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information, such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the display system 100 is shown with the second storage unit 346 as a single hierarchy storage system, although it is understood that the display system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information (e.g. a known test sample) to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive (or retrieve) information in the first communication unit 316 from the second device transmission 310 of the communication path 104.

The display system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be included in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the display system 100 is described by operation of the first device 102 and the second device 106. It is understood that the first device 102 and the second device 106 can operate any of the modules and functions of the display system 100.

Figure 4:
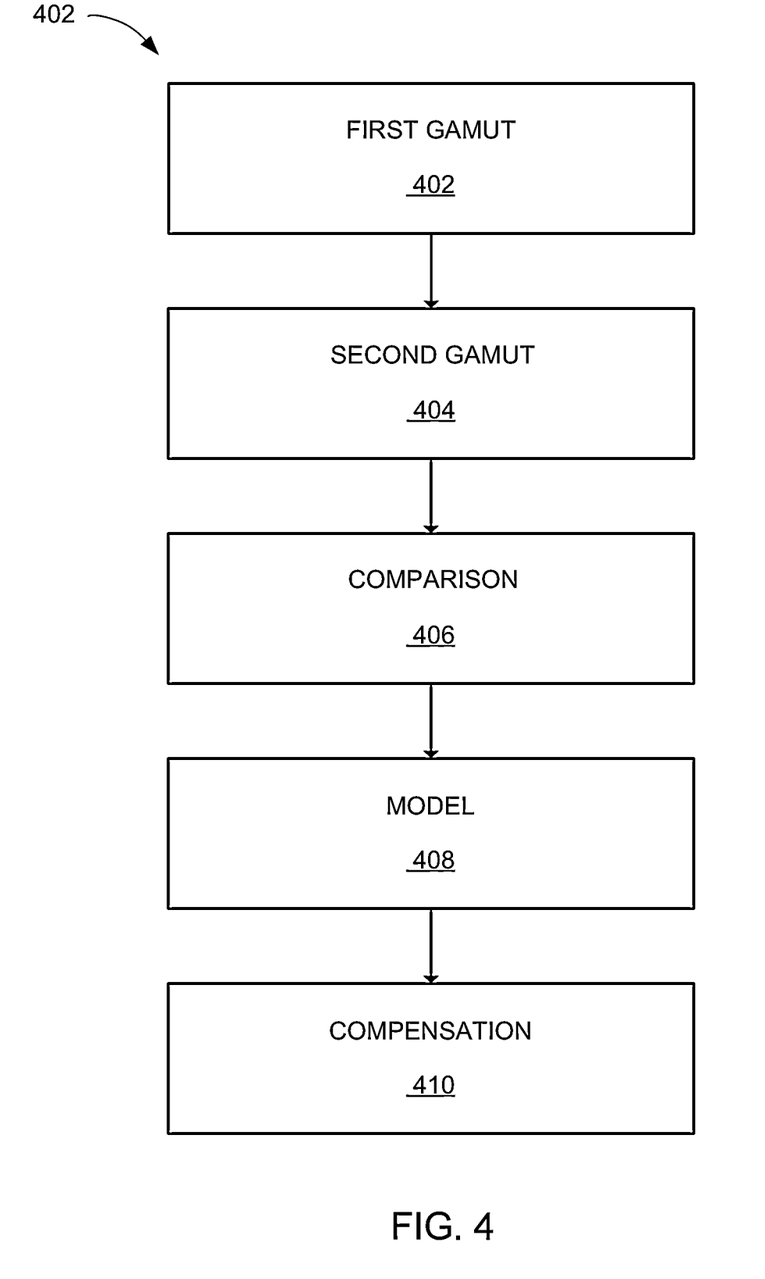
FIG. 4 is a control flow of the display system.

Referring now to FIG. 4, therein is shown a control flow of the display system 100 with image display correction mechanism. In a manner similar to the description of FIGS. 2a and 2b, at least color fade and shift in images and video are corrected and improved. A known test sample is specifically created in such a way that the colors appearing on the images uniformly cover the whole available gamut range. So on the chromatic plane (LUV or XYZ based color spaces can be used), the data points (each point represents a color existing in the frame/image) are rather uniformly distributed across the whole gamut defined by sRGB color space.

After an image or video is uploaded to a web video server and watched on a website, the color quality of the video image generally appears degraded to various extents. If the published video clip is downloaded and watched on a local PC (or PDA or smart phone, etc.), further color quality degradation may be observed. The color quality degradation can appear to human viewers as color shift or fade while on the chromatic plane it appears as movement of data points from their original positions. If the data points on the chromatic plane are considered as a grid or mesh, then the color degradation can result in a shifting and deformation of the grid, called gamut mapping, which can be characterized using various mathematic methods.

In an embodiment of a characterization and correction method for color degradation, the quantitative comparison between the known test sample and the downloaded known test sample is performed in the chromatic domain. First, the image pixels' colors (chromaticity values) are computed and recorded on the chromatic plane as (data) points whose xy coordinates are chromaticity values. All the points from the known test sample can be considered to construct a mesh. Similarly, all the points from the downloaded known test sample can also construct a mesh.

At each pixel location, the known test sample and the downloaded known test sample generally have different colors that correspond to two different locations on the color plane. The color change between the two colors, e.g. data points, can be characterized as a simple linear translation or displacement. However, to characterize the color change between the colors of all pixels between the two samples, the mesh concept can be utilized and the color change can be interpreted as a two-dimensional (2D) spatial transformation problem that transforms one mesh to the other. In the field of image processing, the color change of all the colors within a color gamut is called gamut mapping.

To deal with the gamut mapping problem between the known test sample and the downloaded known test sample, a preferred mathematical tool or model is the third (3rd) or fourth (4th) order bivariate polynomials.

For the modeling purpose, a mathematical tool is needed to quantitatively describe the color change behavior. Since color gamut can be a 2D space and gamut mapping can be considered as a 2D spatial transformation, a bivariate third-order (3rd-order) polynomial transfer function is a preferable mathematical model. The bivariate 3rd-order polynomial transfer function is able to describe smooth 2D spatial transformations with good precision, including translation, rotation, scaling, warping, etc. The 3rd-order polynomial transfer function also has appropriate balance between fitting precision and complexity. In principle, second-order (2nd-order) and fourth-order (4th-order) polynomial functions can also be used to characterize the gamut mapping.

The color of the known test sample of graphics, including images or video on a target display interface, can be measured or modeled in a block 402 as a group of data points on the chromaticity plane, a set of the coefficients for which usually cover an area of the plane. The area is the first (1st) display gamut.

A processor, an application specific integrated circuit (ASIC), an embedded processor, a microprocessor, a hardware control logic, a hardware finite state machine (FSM), a digital signal processor (DSP), or a combination thereof, such as the first control unit 312 of FIG. 3, the second control unit 334 of FIG. 3, or combination thereof, can measure or model the known test sample of graphics in the block 402.

An external communication device, a communication hub, an end point or terminal unit, transmitter, receiver, transceiver, or combination thereof, such as the first communication unit 316 of FIG. 3, the second communication unit 336 of FIG. 3, or combination thereof, can send, receive, or retrieve the known test sample of graphics in the block 402. A projector, a video screen, a speaker, or any combination thereof, such as the first display 202, the second display 212, or combination thereof, can provide a target display for known test sample of graphics.

The color of the known test sample of the graphics including images or video received from a remote device on the target display interface can be measured or modeled in a block 404 as a group of data points on the chromaticity plane, which cover an area of the plane. The area is a second (2nd) display gamut.

A processor, an application specific integrated circuit (ASIC), an embedded processor, a microprocessor, a hardware control logic, a hardware finite state machine (FSM), a digital signal processor (DSP), or a combination thereof, such as the first control unit 312 of FIG. 3, the second control unit 334 of FIG. 3, or combination thereof, can measure or model the received or retrieved graphics of the known test sample from a remote device in the block 404. A projector, a video screen, a speaker, or any combination thereof, such as the first display 202, the second display 212, or combination thereof, can provide a target display for the received or retrieved graphics of the known test sample.

An external communication device, a communication hub, an end point or terminal unit, transmitter, receiver, transceiver, or combination thereof, such as the first communication unit 316 of FIG. 3, the second communication unit 336 of FIG. 3, or combination thereof, can send, receive, or retrieve the received or retrieved known test sample of graphics in the block 404.

The 1st and the 2nd gamut of the known test sample are compared in a block 406 to generate a model of gamut mapping (both forward and inverse) which can be stored in a model server such as a Color Degradation Model Metadata server in the block 408.

A processor, an application specific integrated circuit (ASIC), an embedded processor, a microprocessor, a hardware control logic, a hardware finite state machine (FSM), a digital signal processor (DSP), or a combination thereof, such as the first control unit 312 of FIG. 3, the second control unit 334 of FIG. 3, or combination thereof, can compare the known test sample and the retrieved known test sample in the block 406.

A volatile memory, a nonvolatile memory, an internal memory, an external memory, or a combination thereof, such as the first storage unit 314, the second storage unit 346, or combination thereof, can store the model of gamut mapping in a model server in the block 408.

The original image or video before uploading can be observed as very similar to the downloaded video clips if the obtained forward gamut mapping model is performed on the original image or video. Applying the gamut mapping can correctly describe the color change exhibited on the chromatic plane. Color correction can preferably be implemented in a target or user device as software or hardware with embedded algorithms. A compensation model, which can include a degradation model such as the gamut mapping based Color Degradation Model Metadata, for a specific source or web server can be applied to improve the quality of other graphics including images or video received from the specific web server in a block 410.

An external communication device, a communication hub, an end point or terminal unit, transmitter, receiver, transceiver, or combination thereof, such as the first communication unit 316 of FIG. 3, the second communication unit 336 of FIG. 3, or combination thereof, can send, receive, or retrieve the compensation model in the block 410.

Compensation or correction of unwanted color change can be implemented by reversing a color change process to change color quality back to the original condition, such as performing an inverse 2D spatial transformation (inverse gamut mapping) on the degraded images or video. Solving for the inverse function of the polynomial function is difficult since the polynomial function is the 3rd-order bivariate function.

Alternatively, the inverse transformation can be generated by reversing the order of the image or video. Using the original image or video as input and degraded image or video as target, the calculation produces a transfer function for transforming original image or video into degraded image or video. Given degraded image or video as input and original image or video as the output, the calculation yields a transfer function that transforms the degraded image or video into an image or video very similar to original image or video. Thus, inverse spatial transformation in target or user devices provides correction or improvement for degraded images or video. The transfer function describing the inverse 2D transformation is still a third-order bivariate polynomial function.

An exemplary degradation model such as a Color Degradation Model Metadata is provided based on the comparison of color gamut for specific source or web servers such as web video servers. Further, an exemplary compensation model can include the exemplary degradation, an exemplary correction model, or combination thereof.

The gamut mapping algorithm for web video color correction can be also described using the mathematic language, i.e. the mathematical equations or expressions.

Equations (1) and (2) define the gamut mapping relations between the target or original, and the remote or color degraded images, where $A=[a_1, a_2]$ represents the chromaticity of a pixel on the original image while $B=[b_1, b_2]$ is the chromaticity of a pixel on the degraded image. The transformation (or transfer function) T in Equation (1) describes the color degradation induced by the issues over the internet. According to previous discussion, T also represents the forward 2D transformation on the chromatic plane which converts A to B. On the contrary, $T^{-1}$ represents the inverse transformation between A and B.

$$B=T(A) \quad (1)$$

$$A=T^{-1}(B) \quad (2)$$

According to the spatial transformation based approach for gamut mapping, the degradation model is equivalent to the transformation that describes color change from the known test sample to the downloaded known test sample. The degradation model can also be represented by the transformation T in Equation (1).

T can be numerically determined with the offline process introduced previously. In the preferred embodiment, T is a nonlinear function based on the 3rd (or 4th) order bivariate polynomials. Accordingly, Equation (1) can be re-formulated as in Equation (3) using the matrix format.

$$[b_1 b_2] = [\, 1 \quad a_1 \quad a_2 \quad a_1 a_2 \quad a_1^2 \quad a_2^2 \quad a_1^2 a_2 \quad a_1 a_2^2 \quad a_1^3 \quad a_2^3 \,] \begin{bmatrix} t_0^1 & t_0^2 \\ t_1^1 & t_1^2 \\ t_2^1 & t_2^2 \\ t_3^1 & t_3^2 \\ t_4^1 & t_4^2 \\ t_5^1 & t_5^2 \\ t_6^1 & t_6^2 \\ t_7^1 & t_7^2 \\ t_8^1 & t_8^2 \\ t_9^1 & t_9^2 \end{bmatrix} \quad (3)$$

Equation (2) can be re-formulated in the same way as in Equation (3). The twenty polynomial coefficients ($t_0^1 \ldots t_9^1$, $t_0^2 \ldots t_9^2$) can be computed using the chromaticity data contained in the video clips (the original and the color degraded ones) and certain mathematical tools such as, e.g., Matlab® available from The MathWorks, Inc. of Natick, Mass.

If the preferred mathematical method, the $3^{rd}$ or $4^{th}$ order bivariate polynomials, is used to define the degradation model, the polynomial coefficients need to be computed or obtained based on the chromatic data obtained from both samples. In addition, certain mathematical tools or methods, e.g. Matlab® or user developed computer programs, are also needed to compute the polynomial coefficients.

As for color correction, it is actually defined by Equation (2), the inverse gamut mapping process. When a web video clip is downloaded or streamed to a computer/digital player, the chromatic values [$b_1$, $b_2$] of each pixel will be processed through Equation (2) (or more specifically the inverse mapping version of Equation (3)) to obtain the original color values [$a_1$, $a_2$] (or the corrected/improved color that is close to [$a_1$, $a_2$]) for the correct or improved color representation.

For color correction or compensation, a degradation model might not be directly needed. An inverse version of the degradation model might be used for color correction purposes. A compensation model can preferably include the inverse version of the degradation model with or without the degradation model.

To correct or compensate color degradation of a test sample, an inverse transformation can be applied to a downloaded known test sample, which is also formulated in Equation (2). Equation (2) means that the known test sample (sample with corrected colors) can be obtained by applying the inverse transformation to the downloaded known test sample (color degraded sample). Similar to the degradation model, the polynomial coefficients can be computed for the inverse transformation if the preferred mathematical method is used. The only difference is that the image (B in Equation (1) and A in Equation (2)) and the original image (A in Equation (1) and B in Equation (2)) of the gamut mapping process are reversed between the two cases (Equations (1) and (2)): degradation model and its inverse version (correction model).

For illustrative purposes, the display system 100 provides color correction or compensation. It is understood that the display system 100 may also provide correction, compensation, or improvement of other display elements or display parameters such as aspect ratio, scale, smoothness resolution, frame rate, or combination thereof.

It has been discovered that the display system 100 provides a compensation model, including a degradation model, a correction model, or combination thereof, for specific remote devices based on a known test sample, which enables correction and improvement of any images or videos from a specific remote device 106.

Further, it has been discovered that the gamut of the known test sample of the graphics 204 on the display interface 202 of the first device 102 can be compared to the gamut of the degraded test sample of the graphics 214 on the display interface 202 of the first device 102 to provide the correction and improvement for images or video from the specific remote device 106.

Yet further, it has been discovered that other downloaded samples have the same or similar degradation characteristics as the known test samples. Therefore, the display system 100 can have the proper correction mechanism for various downloaded samples of images or video.

The display system 100 has been described with module functions or order as an example. The display system 100 can partition the modules differently or order the modules differently. For example, the gamut of the graphics 204 of FIG. 2 on the first device 102 of FIG. 1 may be measured after the gamut of the graphics 214 of FIG. 2 on the second device 106 of FIG. 1. The second display 212 of FIG. 2 may not be integral to the second device 106.

The modules described in this application can be hardware implementation or hardware accelerators in the first control unit 312 of FIG. 3 or in the second control unit 334 of FIG. 3. The modules can also be hardware implementation or hardware accelerators within the first device 102 or the second device 106 but outside of the first control unit 312 or the second control unit 334, respectively.

The physical transformation from the compensation model, including a degradation model, a correction model, or combination thereof, results in the movement in the physical world, such as correction or improvement in displaying the graphics 204 or 214. Movement in the physical world results in changes to the images or video by color or chromaticity changes as perceived by user eyes.

Figure 5:
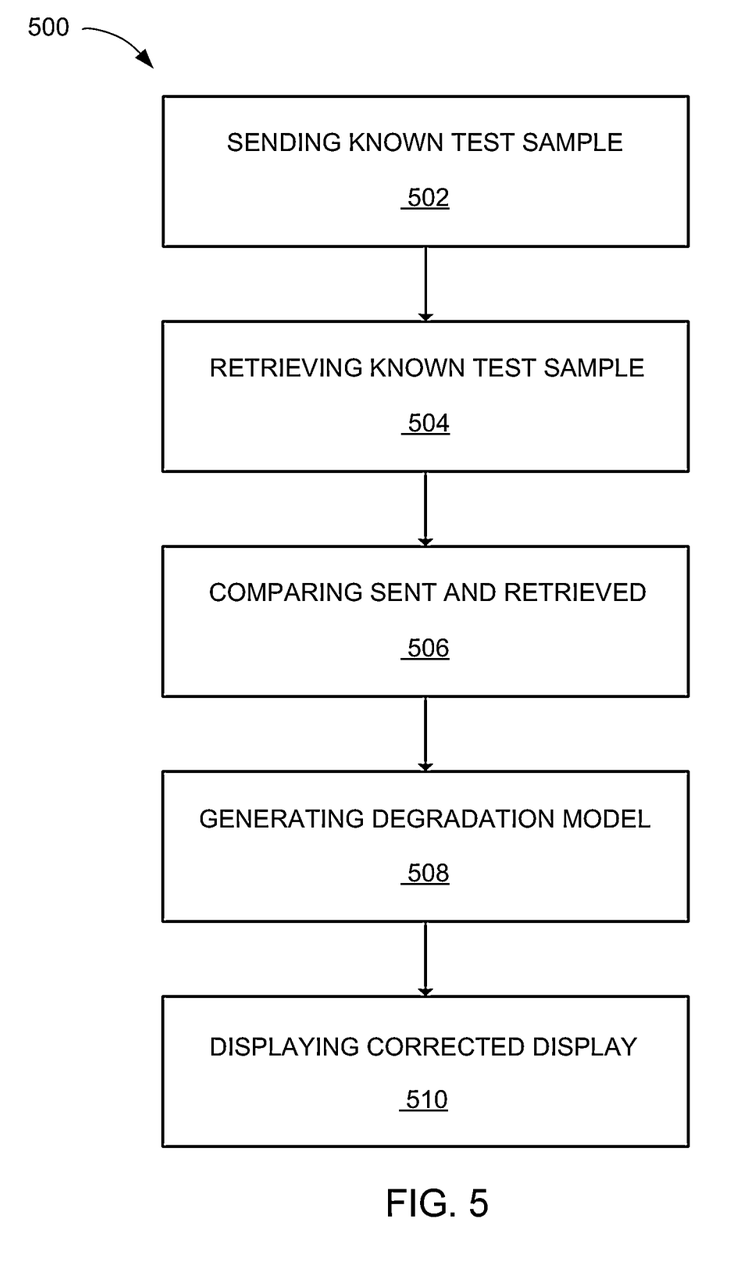
FIG. 5 is a flow chart of a method of operation of a display system in a further embodiment of the present invention.

Referring now to FIG. 5, therein is shown a flow chart of a method 500 of operation of a display system 100 in a further embodiment of the present invention. The method 500 includes: sending a known test sample in a block 502; retrieving the known test sample in a block 504; comparing the known test sample and the retrieved known test sample in a block 506; generating a compensation model based on the comparison for correcting the retrieved known test sample in a block 508; and providing the compensation model for displaying a corrected display on a device in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance of information technology and consumer electronic products.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a display system comprising:
    sending a known test sample for storing the known test salmple on a web server;
    retrieving the known test sample;
    comparing, with a control unit, a gamut map of the known test sample and a gamut map of the retrieved known test sample;
    generating a compensation model based on the comparison for correcting the retrieved known test sample; and
    providing the compensation model for displaying a corrected display on a device.

2. The method as claimed in claim 1 wherein generating the compensation model includes generating a model based on spatial transformation.

3. The method as claimed in claim 1 wherein generating the compensation model includes generating a model based on inverse spatial transformation.

4. The method as claimed in claim 1 wherein providing the compensation model includes providing Color Degradation Model Metadata.

5. A method of operation of a display system comprising:
    sending a known test sample having a gamut map for storing the hnozvn test sample on a web server;
    retrieving the known test sample having a degraded gamut map;
    comparing, with a control unit, the gamut map of the known test sample and the degraded gamut map of the retrieved known test sample;
    generating a compensation model based on the comparison for correcting the retrieved known test sample; and
    providing the compensation model for displaying a corrected display on a device.

6. The method as claimed in claim 5 wherein sending the known test sample includes sending the known test sample having colors that uniformly cover an available gamut range.

7. The method as claimed in claim 5 wherein generating the compensation model includes generating a model based on a two-dimensional spatial transformation.

8. The method as claimed in claim 5 wherein generating the compensation model includes generating a model based on inverse spatial transformation with a reverse order of the known test sample and retrieved known test sample.

9. The method as claimed in claim 5 wherein providing the compensation model includes providing Color Degradation Model Metadata for storage on a model server.

10. A display system comprising:
    a communication unit configured to send a known test sample for storing the know test sample on a web server and configured to retrieve the known test sample;
    a control unit, coupled to the communication unit, configured to compare a gamut map of the known test sample and a gamut map of the retrieved known test sample, and configured to generate a compensation model based on the comparison for correcting the retrieved known test sample; and
    a storage unit, coupled to the control unit, configured to provide the compensation model for displaying a corrected display on a device.

11. The system as claimed in claim 10 wherein the control unit configured to generate the compensation model includes the control unit configured to generate a model based on spatial transformation.

12. The system as claimed in claim 10 wherein the control unit configured to generate the compensation model includes the control unit configured to generate a model based on inverse spatial transformation.

13. The system as claimed in claim 10 wherein the storage unit configured to provide the compensation model includes the storage unit configured to provide Color Degradation Model Metadata.

14. The system as claimed in claim 10 wherein:
    the communication unit is configured to retrieve the known test sample having a degraded gamut; and
    the control unit is configured to compare the gamut of the known test sample and the degraded gamut of the retrieved known test sample.

15. The system as claimed in claim 14 wherein the communication unit configured to send the known test sample includes the communication unit configured to send the known test sample having colors that uniformly cover an available gamut range.

16. The system as claimed in claim 14 wherein the control unit configured to generate the compensation model includes the control unit configured to generate a two-dimensional spatial transformation.

17. The system as claimed in claim 14 wherein the control unit configured to generate the compensation model includes the control unit configured to generate a model based on inverse spatial transformation with a reverse order of the known test sample and retrieved known test sample.

18. The system as claimed in claim 14 wherein the storage unit configured to provide the compensation model includes the storage unit configured to provide Color Degradation Model Metadata for storage on a model server.

* * * * *